Sept. 25, 1962 K. M. HOGLUND 3,056,079

VARIABLE GAIN MAGNETIC AMPLIFIER

Filed Feb. 25, 1959 2 Sheets-Sheet 1

INVENTOR.
KENNETH M. HOGLUND
BY Marvin Moody
ATTORNEY

VARIABLE GAIN MAGNETIC AMPLIFIER

Filed Feb. 25, 1959 2 Sheets-Sheet 2

INVENTOR.
KENNETH M. HOGLUND
BY
Main Moody
ATTORNEY

United States Patent Office 3,056,079
Patented Sept. 25, 1962

3,056,079
VARIABLE GAIN MAGNETIC AMPLIFIER

Kenneth M. Hoglund, St. Paul, Minn., assignor to Collins Radio Company, Cedar Rapids, Iowa, a corporation of Iowa Filed Feb. 25, 1959, Ser. No. 795,507
5 Claims. (Cl. 323—89)

This invention relates to a means for varying the gain of a magnetic amplifier without the use of mechanical potentiometers or servo systems and the like.

As an aircraft approaches an omni-range transmitter, errors in heading cause an error signal to be developed at the output of the receiver computer. The magnitude of the error signal is proportional to the angle between the actual heading and the desired heading of the aircraft, but is not proportional to the distance of the aircraft from the transmitter. However, as the airplane approaches the transmitter, the magnitude of the error signals to the autopilot calling for a "bank" to return the plane on course, should be continually reduced in order to prevent the airplane from overshooting the desired heading, thus requiring a counter correction. Therefore, if a means is devised to gradually reduce the gain of the autopilot as the aircraft approaches the transmitter in the relationship where $$\text{Gain} = K \cdot \frac{1}{d}$$

$d$ being the distance between the plane and the transmitter, the tendency to overshoot will be greatly reduced or eliminated.

Prior to this invention a potentiometer driven by a servo system was employed to change the feedback of the magnetic amplifier in the autopilot channel that causes the aircraft to "bank." However, this system is expensive, requires many parts, and is subject to unreliability due to failure of the potentiometer or synchro device, etc.

It is, therefore, an object of this invention to provide an electronic gain control for a magnetic amplifier.

It is another object of this invention to provide a means for varying the gain of a magnetic amplifier by using a direct current voltage.

It is still another object of this invention to provide a means for changing the gain of a magnetic amplifier without changing the operating point of the amplifier or the null point of the magnetic amplifier.

It is still another object of this invention to provide a means for electronically varying the gain of a magnetic amplifier from a remote position without the use of mechanical devices, such as potentiometers and the like.

This invention features a signal level magnetic amplifier of the type that incorporates feedback and in addition has resistive means inserted in the feedback winding to permit variation of the feedback current. An electronic switch is inserted across the feedback resistors and is operated by a second or controller magnetic amplifier. The controller magnetic amplifier is responsive to the remote direct current source, such as an automatic volume control signal. As the voltage of the remote direct current source varies, the output from the controller magnetic amplifier varies in the same proportion. The output from the controller magnetic amplifier operates the electronic switch causing the feedback resistors of the signal level magnetic amplifier to be shorted for a period of time which is proportional to the level of the input signal. The gain from the signal level magnetic amplifier will then be determined by the average value of the feedback resistance which will in turn be determined by the average time that the feedback resistors are shorted.

Further objects, features, and advantages of the invention will become apparent from the following description and claims when read in view of the accompanying drawings, in which:

Figure 1:
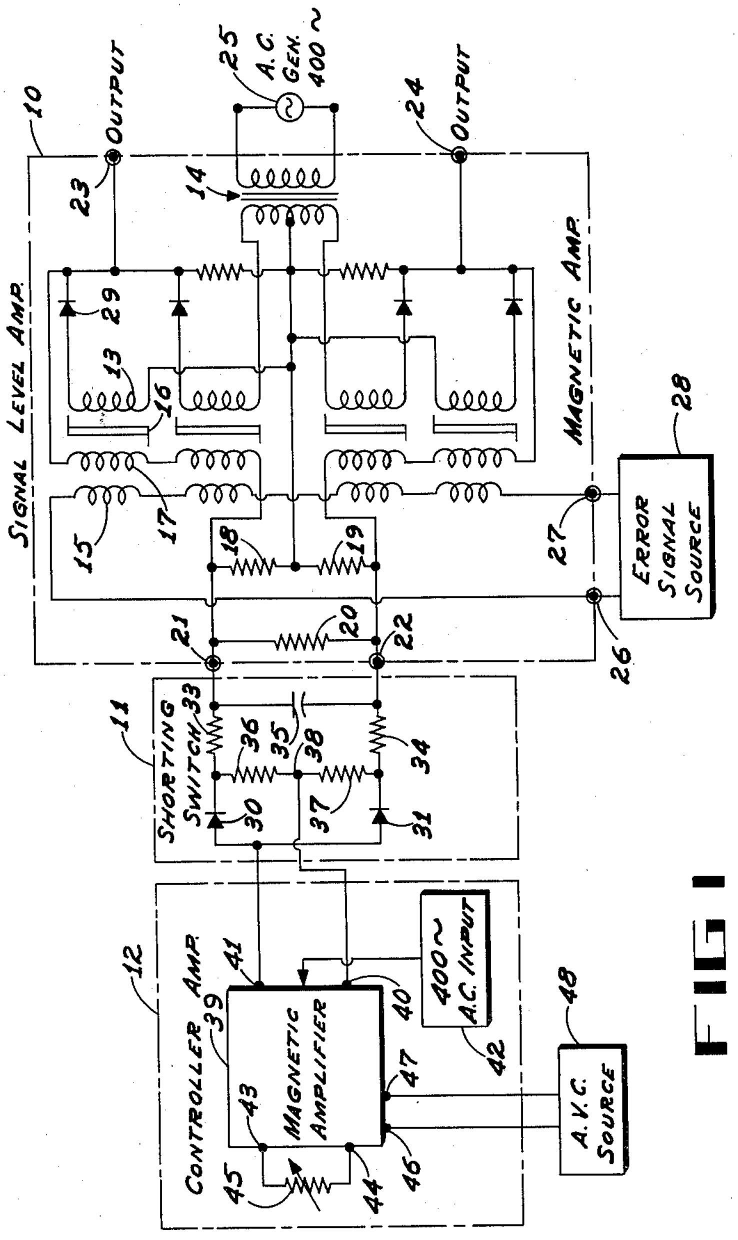
FIGURE 1 shows a schematic diagram depicting one embodiment of this invention.

The circuit, as shown in FIGURE 1, consists of three basic circuits, a signal level amplifier 10, a shorting switch 11 and a controller amplifier 12. The signal level amplifier 10 is a basic push-pull magnetic amplifier of the type which includes a plurality of cores 16, each of which contains an output winding 13, and a control or input winding 15 for receiving an input signal.

A feedback winding 17 has been wound about the cores, and phased with the control or input windings 15 such that current from the output windings will oppose magnetic lines of flux from the control windings. A pair of serially-connected feedback resistors 18 and 19 in combination with a resistor 20 is connected in series with the feedback winding 17. A pair of terminals 21 and 22 is connected across the ends of resistor 20 to permit external modification of the feedback resistance. A pair of output terminals 23 and 24 is connected to the output windings 13. An alternating current generator 25 has its output connected to a transformer 14 which provides voltage or A.-C. power for the magnetic amplifier. An error signal source 28 is connected to the control winding 15 by a pair of terminals 26 and 27. The magnetic amplifier also contains diodes such as 29 for rectifying the output voltage.

For further information concerning the basic magnetic amplifier, reference can be made to a work published by George M. Ettinger entitled "Magnetic Amplifiers," page 10.

The electronic shorting switch 11 contains a pair of diodes 30 and 31 connected to terminals 21 and 22 through a pair of resistors 33 and 34 respectively. A filter capacitor 35 is connected in shunt with the output of the shorting switch. A pair of serially-connected resistors 36 and 37 have their ends connected to the cathodes of diodes 30, 31 respectively. A junction 38 of the serially-connected resistors 36 and 37 is connected to an output terminal 40 of the controller amplifier 12. The anodes of diodes 30, 31 are connected together and connected to another output terminal 41 of the controller amplifier 12.

The basic magnetic amplifier 39 for the controller amplifier 12 is exactly the same type as that illustrated in the signal level amplifier 10. The excitation generator 42 is the same type as generator 25 and is in phase with generator 25; for most uses both generators 42 and 25 may be the same generator. Terminals 43 and 44 perform the same function as terminals 21 and 22 and provide an external means for shunting the magnetic amplifier feedback circuit with a potentiometer 45. The direct current input signal to the controller amplifier enters the control windings at terminals 46 and 47 from an external source 48 which may be an automatic volume control source from an omni-receiver (not shown).

Figure 2:
FIGURE 2 shows a typical feedback pulse.

In operation, if feedback resistors 18 and 19 are shorted out for a certain percentage of time, the average value of the total resistance of the feedback circuit will be decreased proportionally. Thus if resistors 18 and 19 are shorted out fifty percent of the time, their effective resistances will be one-half the resistance prior to shorting. However, feedback current is in the form of pulses 50 as illustrated in FIGURE 2 which varies in width with input voltage; with maximum input current the feedback pulse achieves a maximum width as indicated by the dotted waveform. Thus, if a current is going to be effective in shorting out a pulse of this type, it must be able to develop characteristics similar to the feedback pulse. For this reason, a similar magnetic amplifier 12 was selected to develop output pulses which would be similar to the pulses developed in the signal level amplifier feedback circuit. Output from the controller amplifier is applied to the shorting switch 11 which performs the function of shorting the feedback resistors for a time depending upon the pulse width from the controller amplifier. This is accomplished by biasing diodes 30 and 31 to conduct when the pulse appears across output terminals 40, 41 of controller amplifier 12. When diodes 30, 31 are biased to conduct, resistors 36 and 37 are essentially shorted, thereby shorting the feedback resistors 18 and 19.

Figure 3:
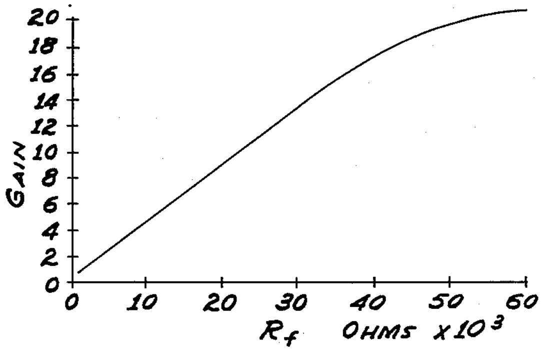
FIGURE 3 shows a graph indicating the change of gain of the signal level magnetic amplifier with change in feedback resistance.

FIGURE 3 illustrates the change in gain of the magnetic amplifier with varying average resistances of the feedback resistors. Resistors 33 and 34 in cooperation with capacitor 35 were added to improve the linearity of the system and to maintain the desired response time. However, because of their inclusion, it is obvious that the feedback resistors 18 and 19 can never reach the theoretical zero resistance, but must reach some finite minimum resistance. The minimum resistance of the feedback resistors for this particular embodiment is approximately 7,500 ohms which represents the diodes being conductive for one hundred percent of the period of the feedback pulse. A maximum impedance of 56,000 ohms is obtained when the feedback pulse is shorted for zero percent of the time. Since the cores of the magnetic amplifier and the inductance wound about the cores performs an integrating function, the rapid shorting and opening of the feedback resistor will not present a varying output at terminals 23 and 24, but will present a gradual change in resistance. Values of 2,000 ohms for resistors 33, 34 and .2 of a microfarad for capacitor 35 were found to satisfy the circuit requirements.

Figure 4:
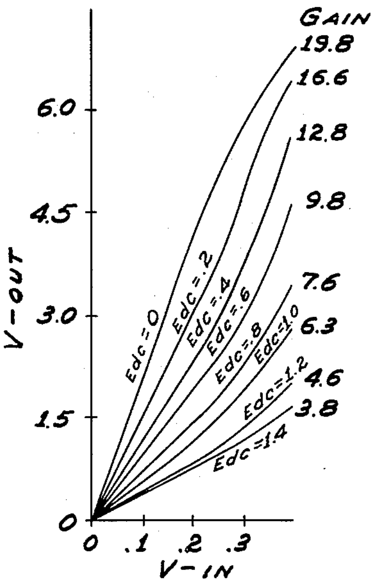
FIGURE 4 shows the variation and gain of the signal level magnetic amplifier with variation in control voltage.

FIGURE 4 shows the results obtained by varying the input voltage $E_{dc}$ from automatic volume control source 48 at terminals 46, 47 in increments of .2 of a volt and measuring the output voltage $V_{out}$ at terminals 23 and 24 while varying the error signal source voltage of $V_{in}$ between 0 and .4 volts at terminals 26 and 27. This graph illustrates that when $E_{dc}$ at terminals 46 and 47, for example, was 1.2 volts, the output voltage was 1½ volts when the error signal voltage at terminals 26, 27 was approximately .32 volts, giving the over-all system a gain of approximately 4.6.

Thus a circuit has been provided which shows a method of varying the gain of a magnetic amplifier without the aid of external mechanical potentiometers and complicated servo mechanism loops, and the like. The circuit is also extremely adaptable for receiving automatic volume control voltages and utilizing them as a control voltage for reducing the gain of an autopilot as a plane approaches the transmitter. This system also increases the reliability of the automatic pilot by substituting highly reliable magnetic amplifier circuitry for mechanical linkages, servo mechanisms or other mechanisms.

Although this invention has been described with respect to a particular embodiment thereof, it is not to be so limited as changes and modifications may be made therein which are within the full intended scope of the invention as defined by the appended claims.

I claim:

1. A variable gain magnetic amplifying device of the type used in aircraft and the like to vary the magnitude of an angular error signal in proportion to the distance between the aircraft and a fixed reference to permit proper correction for eliminating said angular error, said device comprising: a magnetic amplifier having input winding means, output winding means, and a feedback circuit connected with said output winding means and including resistance means; means connecting said output winding means with a source of A.-C. power; means connecting said input winding means with an angular error signal source, said error signal being determined from a fixed referencing point; a second signal source for producing a signal the magnitude of which is determined by the distance to said referencing point; and means connected with said resistance means and said second signal source to automatically vary the effective resistance of said resistance means in proportion to the distance from said referencing point whereby the gain of said amplifying device is decreased as the distance to said referencing point decreases.

2. A variable gain magnetic amplifying circuit comprising: a magnetic amplifier having a signal input winding, an output winding and a feedback winding; means connecting said output winding with a source of A.-C. power; means connecting said signal input winding with an error signal source; resistance means connecting said feedback winding with said output winding for coupling a feedback pulse to said feedback winding; a second signal source; means connected with said second signal source and providing an output pulse having characteristics similar to said feedback pulse, the width of said output pulse being determined by the magnitude of the signal from said second signal source; and means for coupling the output pulse from said last named means to said resistance means to short out the latter for a period of time determined by the pulse width of said output pulse to thereby control the effective resistance of said resistance means whereby the gain of said amplifier is caused to vary in accordance with the magnitude of the signal from said second signal source.

3. A variable gain magnetic amplifying device of the type used in aircraft and the like to vary the magnitude of an angular error signal in proportion to the distance between the aircraft and an omni-range transmitter to assure against over correction of the heading of the aircraft due to an error signal of improper magnitude for the required correction, said device comprising: a magnetic amplifier having signal input means, signal output means, and a feedback circuit that includes resistance means, said feedback circuit being connected with said output means to provide feedback current in said feedback circuit; means connecting said output means with a source of A.-C. power; means connecting said input means with an angular error signal source the magnitude of which signal is controlled by the difference between actual heading and a desired heading, the latter being determined with respect to an omni-range transmitter; a second signal source producing a direct current signal having a magnitude determined by the distance to said omni-range transmitter; amplifying means connected with said second signal source providing an output pulse the width of which is determined by the magnitude of the signal from said second signal source; and means for coupling the output of said amplifying means to said resistance means to short out the latter for a period of time determined by the width of said output pulse whereby the effective resistance of said resistance means is varied according to the magnitude of the signal from said second signal source to control the magnitude of the output from said magnetic amplifier.

4. A variable gain magnetic amplifying circuit comprising: first and second magnetic amplifiers each of which has input winding means and output winding means, said first magnetic amplifier also having a feedback circuit that includes feedback winding means; means connecting said feedback winding means to the output winding means of said first magnetic amplifier to provide current for the feedback circuit; means connecting said output winding means with a source of A.-C. power; an error signal source; means connecting the input winding means of said first magnetic amplifier to said error signal source; a second signal source that is uneffected by the output of said first magnetic amplifier; means connecting said second signal source with the input winding means of said second magnetic amplifier for providing a signal thereto; and switching means connected between the output winding means of said second magnetic amplifier and the feedback winding means of said first magnetic amplifier, said switching means being responsive to an output from said second magnetic amplifier to vary the feedback current of said first magnetic amplifier for a period of time determined by the magnitude of said second signal so that the gain of said first magnetic amplifier is controlled by the signal from said second signal source.

5. The variable gain magnetic amplifying circuit of claim 4 wherein said feedback circuit includes resistance means serially connected with said feedback winding means; the output winding means of said first magnetic amplifier includes a pair of output terminals for coupling an output signal therefrom; and said switching means includes a pair of unidirectional conduction devices each of which has an anode connected with one said output terminal and a cathode connected with the other said output terminal through impedance means connected therewith, one said cathode also being connected to one side of said resistance means and the other said cathode also being connected to the other side of said resistance means to short out the same during the conductive period of said conductive devices, which period is determined by the output of said first magnetic amplifier.

References Cited in the file of this patent

UNITED STATES PATENTS

| | | |
|---|---|---|
| 2,269,408 | Kinsburg | Jan. 6, 1942 |
| 2,283,241 | Van Cott | May 19, 1942 |
| 2,343,207 | Schroder et al. | Feb. 29, 1944 |

FOREIGN PATENTS

| | | |
|---|---|---|
| 624,866 | Great Britain | June 16, 1949 |